United States Patent
Omeragic et al.

(10) Patent No.: US 6,556,015 B1
(45) Date of Patent: Apr. 29, 2003

(54) METHOD AND SYSTEM FOR DETERMINING FORMATION ANISOTROPIC RESISTIVITY WITH REDUCED BOREHOLE EFFECTS FROM TILTED OR TRANSVERSE MAGNETIC DIPOLES

(75) Inventors: Dzevat Omeragic, Sugar Land, TX (US); Gerald N. Minerbo, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/975,411

(22) Filed: Oct. 11, 2001

(51) Int. Cl.⁷ .............................. G01V 3/26; G01V 3/28; G01V 3/30
(52) U.S. Cl. ........................................ 324/338; 324/343
(58) Field of Search .................. 324/338–343; 702/7

(56) References Cited

U.S. PATENT DOCUMENTS

| | | | |
|---|---|---|---|
| 3,187,252 A | * 6/1965 | Hungerford | 324/343 |
| 4,264,862 A | 4/1981 | Koelle et al. | |
| 4,302,722 A | * 11/1981 | Gianzero | 324/339 |
| 4,302,723 A | * 11/1981 | Moran | 324/343 |
| 4,319,191 A | 3/1982 | Meador et al. | |
| 4,636,731 A | * 1/1987 | Savage et al. | 324/338 |
| 4,972,150 A | * 11/1990 | Tabbagh | 324/339 |
| 5,115,198 A | * 5/1992 | Gianzero et al. | 324/339 |
| 5,757,191 A | 5/1998 | Gianzero | |
| 6,044,325 A | * 3/2000 | Chakravarthy et al. | 702/7 |
| 6,147,496 A | * 11/2000 | Strack et al. | 324/343 |
| 6,181,138 B1 | * 1/2001 | Hagiwara et al. | 324/338 |
| 6,393,364 B1 | * 5/2002 | Gao et al. | 702/7 |

* cited by examiner

Primary Examiner—Gerard R. Strecker
(74) Attorney, Agent, or Firm—Victor H. Segura; Brigitte L. Jeffery; John J. Ryberg

(57) ABSTRACT

Systems and methods are provided for determining subsurface formation properties using an antenna system disposed within a borehole traversing the formation. A logging system includes a well tool implemented with an antenna system having transverse or tilted magnetic dipoles. One antenna implementation uses a set of three coils having non-parallel axes. Through mechanical or electromagnetic rotation of an antenna about its axis in order to maximize or minimize couplings, the systems and methods are used to estimate formation anisotropic resistivity, providing reduced borehole effects in vertical and small deviation wells. This invention may also be applied in deviated wells when the borehole is perpendicular to the strike direction, as is often the case in wireline logging.

37 Claims, 7 Drawing Sheets

$M_T = M\,\rho$
$M_R = M\,\rho$
moderate borehole effect $M_T = M\,z$
$M_R = M\,\rho$
coupling sensitive to decentralization $M_T = M\,\phi$
$M_R = M\,\phi$
large borehole effect $M_T = M\,\phi$
$M_R = M\,z$ or $M\,\rho$
minimal coupling

METHOD AND SYSTEM FOR DETERMINING FORMATION ANISOTROPIC RESISTIVITY WITH REDUCED BOREHOLE EFFECTS FROM TILTED OR TRANSVERSE MAGNETIC DIPOLES

BACKGROUND OF THE INVENTION

1. Field of the Invention

This invention relates generally to the field of well logging. More particularly, the invention concerns improved methods and systems in which an antenna system having transverse or tilted magnetic dipoles is used to estimate formation anisotropic resistivity, providing reduced borehole effects in vertical and small deviation wells. This invention is applicable to induction or propagation type measurements, i.e., at low and high frequencies.

2. Description of Related Art

Induction and propagation logging techniques have been employed in exploration operations for many years to measure the electrical conductivity (or its inverse, resistivity) of subsurface formations. These techniques entail deployment of antenna systems into a borehole to emit electromagnetic (EM) energy through the borehole fluid (also referred to herein as mud) and into the subsurface formations. Conventional antennas are formed from coils of the cylindrical solenoid type comprised of one or more turns of insulated conductor wire wound around a support. These antennas are typically operable as sources and/or sensors.

In operation, a transmitter antenna is energized by an alternating current to emit EM energy. The emitted energy interacts with the mud and the formation, producing signals that are detected and measured by one or more of the antennas. The detected signals are usually expressed as a complex number (phasor voltage) and reflect the interaction with the mud and the formation. By processing the detected signal data, a profile of the formation and/or borehole properties is determined.

A coil carrying a current can be represented as a magnetic dipole having a magnetic moment proportional to the current and the area encompassed by the coil. The direction and strength of the magnetic dipole moment can be represented by a vector perpendicular to the area encompassed by the coil. In conventional induction and propagation logging systems, the antennas are typically mounted on a support with their axes along the longitudinal axis of the support. Thus, these instruments are implemented with antennas having longitudinal magnetic dipoles (LMD). When such an antenna is placed in a borehole and energized to transmit EM energy, currents flow around the antenna in the borehole and in the surrounding formation. There is no net current flow up or down the borehole.

An emerging technique in the field of well logging is the use of instruments incorporating antennas having tilted or transverse coils, i.e., where the coil's axis is not parallel to the support axis. These instruments are thus implemented with antennas having a transverse or tilted magnetic dipole (TMD). One particular implementation uses a set of three coils having non-parallel axes (referred to herein as tri-axial). The aim of these TMD configurations is to provide EM measurements with directional sensitivity to the formation properties. Logging instruments equipped with TMDs are described in U.S. Pat. Nos. 6,163,155, 6,147,496, 5,757,191, 5,115,198, 4,319,191, 5,508,616, 5,757,191, 5,781,436, 6,044,325, 4,264,862 and 6,147,496.

If a transmitter is placed in a homogeneous medium, currents will flow in paths surrounding the transmitter. When a borehole is added, these current paths are distorted. These currents induce a voltage in a receiver displaced from the transmitter. This voltage is an indication of the resistivity of the formation. If instead of a homogeneous medium, we include a borehole, then the current paths are altered and hence the received voltage is different from what would be measured in the absence of a borehole. This difference is called the "borehole effect." The difference in borehole effect between a LMD-based tool and a TMD-based tool is due to the difference between the distortion of the currents in the presence of a borehole.

A particularly troublesome property of the TMD is the extremely large borehole effect that occurs in high contrast situations, i.e., when the mud in the borehole is much more conductive than the formation. When a TMD is placed in the center of a borehole, there is no net current along the borehole axis. A TMD can be eccentered in a borehole in two possible orientations, which we will call parallel and perpendicular eccentering as shown in FIG. 1. In parallel eccentering, the TMD is in a direction parallel to the direction of the magnetic moment. The symmetry of this situation insures that there is still no net current along the borehole axis. However, when a TMD is eccentered in a direction perpendicular to the direction of the magnetic moment, axial currents are induced in the borehole. In high contrast situations these currents can flow for a very long distance along the borehole. When these currents pass by TMD receivers, they can cause undesired signals that are many times larger than would appear in a homogeneous formation without a borehole, resulting in erroneous measurements.

The techniques for processing measured signal data to determine formation parameters involve a number of mathematical calculations. U.S. Pat. No. 4,302,722 (assigned to the present assignee) describes techniques for determining formation conductivity and anisotropy parameters from the measurements. U.S. Pat. Nos. 5,781,436, 5,999,883 and 6,044,325 describe methods for producing estimates of various formation parameters from tri-axial measurements. U.S. Pat. No. 5,041,975 (assigned to the present assignee) describes a technique for processing signal data from downhole measurements in an effort to correct for borehole effects. U.S. Pat. No. 5,058,077 describes a technique for processing downhole sensor data in an effort to compensate for the effect of eccentric rotation on the sensor while drilling.

It is desirable to have a simplified technique for measuring anisotropic resistivity using well tools implemented with TMDs. Thus there remains a need for improved measurement techniques that reduce or eliminate borehole effects associated with the flow of undesired axial currents along the borehole.

SUMMARY OF THE INVENTION

Systems and methods are provided for determining subsurface formation properties from EM measurements. The measurements are acquired within the formation with a well tool adapted with a TMD antenna system.

One aspect of the invention provides a method for determining a property of a subsurface formation using an antenna system disposed within a borehole traversing the formation. The method comprises determining when a magnetic dipole moment of a transmitter antenna of the system is oriented substantially perpendicular with respect to the wall of the borehole; determining the coupling between a receiver antenna of the system and the transmitter antenna when the dipole moment is in the substantially perpendicular orientation; and using the coupling between the antennas to determine the formation property.

Another aspect of the invention provides a method for determining a property of a subsurface formation from signal data obtained with a transmitter antenna and a receiver antenna disposed within a borehole traversing the formation. The method comprises determining the orientation of a magnetic dipole moment of the transmitter antenna using the signal data; determining the coupling between the transmitter antenna and the receiver antenna with the dipole moment oriented substantially perpendicular with respect to the wall of the borehole; and using the coupling between the antennas to determine the formation property.

Another aspect of the invention provides a well logging system including a well tool adapted for deployment through a borehole traversing an earth formation and an apparatus adapted for coupling to the well tool, the well tool having a longitudinal axis and including a transmitter antenna and a receiver antenna disposed thereon. The apparatus comprises means for determining when a magnetic dipole moment of the transmitter antenna is oriented substantially perpendicular with respect to the wall of the borehole; means for determining the coupling between the transmitter antenna and the receiver antenna with the dipole moment in the substantially perpendicular orientation; and means for determining a property of the formation using the coupling between the antennas.

BRIEF DESCRIPTION OF THE DRAWINGS

Other aspects and advantages of the invention will become apparent upon reading the following detailed description and upon reference to the drawings in which.

DESCRIPTION OF SPECIFIC EMBODIMENTS

The present invention concerns subsurface EM measurements and the processing of signal data to determine antenna couplings, i.e., the voltages induced at receiver antennas by respective transmitter antennas. From the above observations, a strategy for reduction of borehole eccentricity effects for a system of TMDs is determined. This strategy is based on cancellation of the longitudinal current near the receiver or cancellation of the azimuthal component of the TMD source field. A way to eliminate the unwanted modes is to direct the antenna's magnetic field so the resulting magnetic dipole only has a radial component (radial TMD), which is achieved with the TMD in the parallel orientation.

Figure 1:
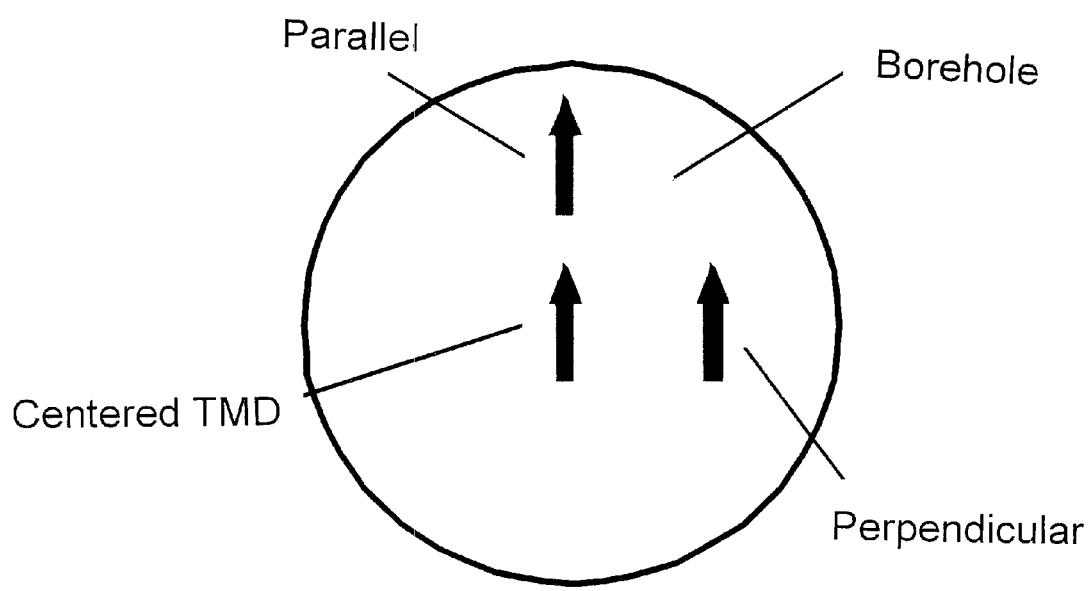
FIG. 1 shows a pictorial looking downhole of parallel and perpendicular eccentering of a tilted or transverse magnetic dipole within a borehole.
Figure 2:
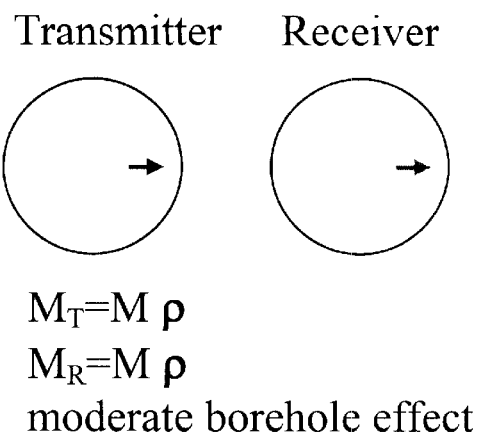
FIG. 2 shows pictorials looking downhole of various positions and orientations of transmitters and receivers in a borehole.
Figure 2:
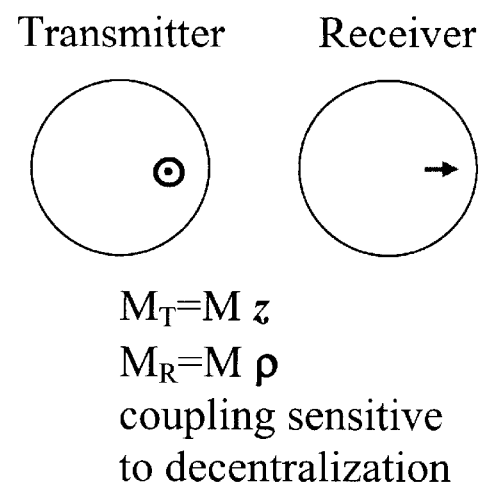
Figure 2:
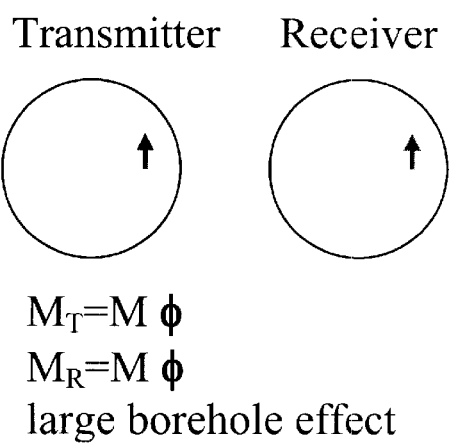
Figure 2:
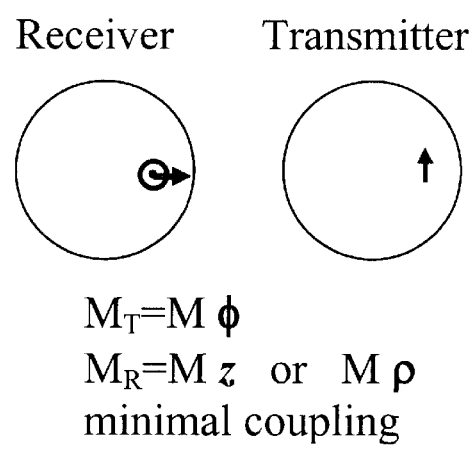

The antenna or field source is treated herein as a magnetic dipole of strength M and the radial and azimuthal positions of the transmitter and receiver are considered the same in the borehole, i.e. $(\rho_T, \phi_T)=(\rho_R, \phi_R)$. Five transmitter and receiver orientations of interest are shown in FIG. 2. A perpendicularly eccentered TMD produces only an azimuthal component of the magnetic field in all points with the same polar coordinates $(\rho, \phi)$, while a parallel eccentered TMD induces voltages in radially and axially (longitudinally) oriented antennas. The techniques of the invention are suitable for configurations when couplings of TMDs and LMDs are separable and sensitive to orientation of TMDs. That is, when the orientation of minimal and maximal coupling can be distinguished. That is generally the case in vertical and small deviation wells.

Figure 3:
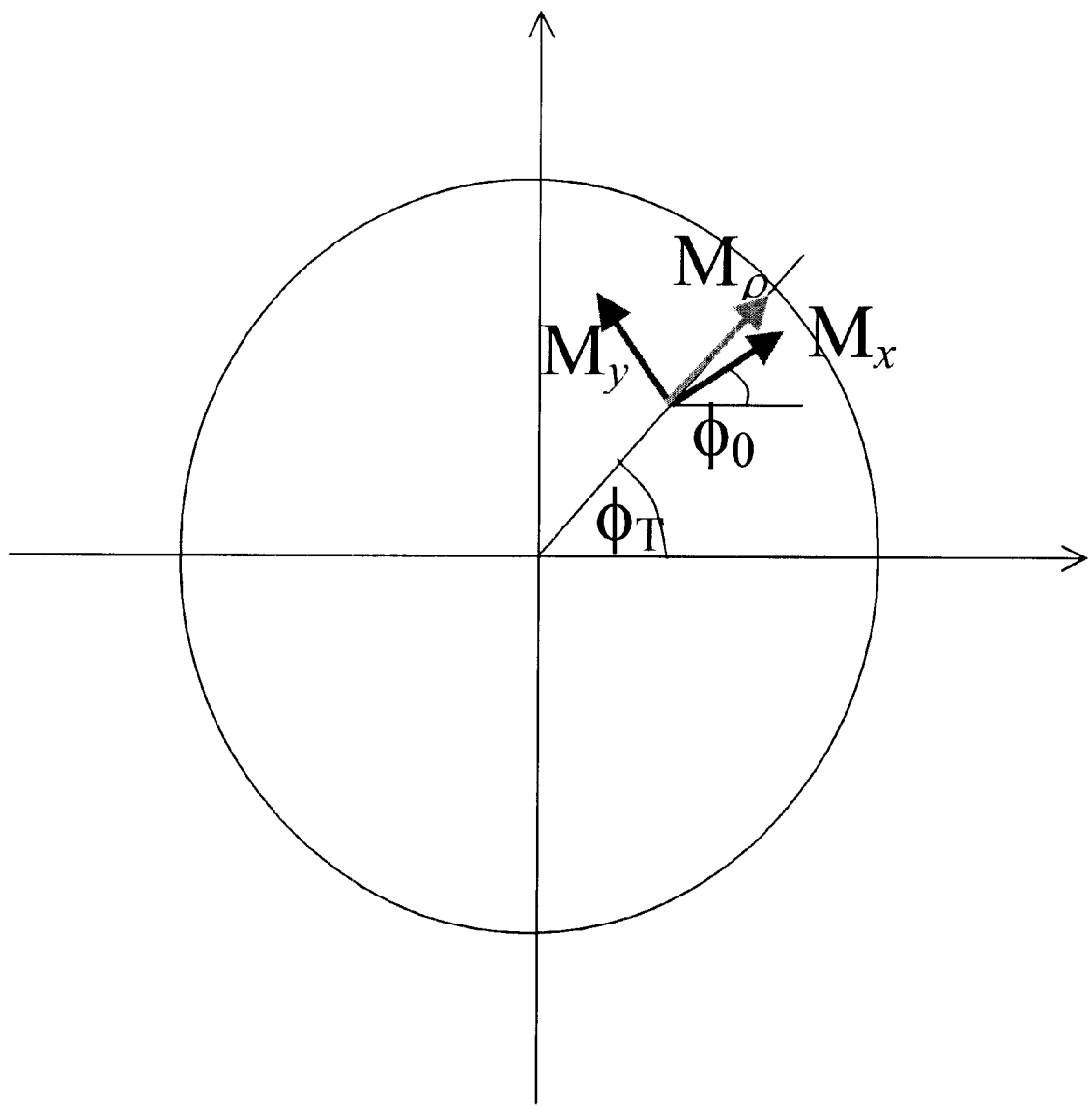
FIG. 3 shows a pictorial looking downhole of two transverse antennas arbitrarily oriented within the borehole.

By rotating (mechanically or electromagnetically) an antenna about its axis in order to maximize the coupling between a TMD and a LMD antenna, the borehole effect may be canceled. Consider two mutually orthogonal TMDs, $M_x$ and $M_y$ in the circular borehole shown in FIG. 3. In the local coordinate system, tied to the borehole, the radial components of the magnetic dipoles are:

$$M_{x\rho} = M_x \cos(\phi_T - \phi_0) \qquad (1)$$

$$M_{y\rho} = M_y \cos(\frac{\pi}{2} - \phi_T + \phi_0) = M_y \sin(\phi_T - \phi_0).$$

If the currents of two transverse transmitters are the same, i.e., $M_x=M_y=M$, then the azimuthal coordinate of the transmitter $M_x$ can be determined from $$\tan(\phi_T - \phi_0) = \frac{V_{yz}}{V_{xz}}, \qquad (2)$$

where $V_{xz}$ and $V_{yz}$ are couplings of longitudinal (z directed) receivers with x and y directed transmitters.

Equivalent magnetic dipoles need to be rotated about the instrument axis for the angle $(\phi_T - \phi_0)$ and the resulting dipole has to be pointed in the direction perpendicular to the borehole wall. The rotation of magnetic dipoles can be done electromagnetically, by changing the magnitude (scaling) of transmitter currents of x and y directed sources, $M_x$ and $M_y$, or physically, by mechanically rotating the instrument for the angle $(\phi_T - \phi_0)$, i.e., until the coupling of one TMD transmitter with a LMD receiver is maximal.

In electromagnetic rotation, the coils are selectively excited using scaling factors. The scaling factors $a_x$ and $a_y$ for two transverse transmitters are $$M = a_x M_x + a_y M_y$$

$$a_x = \cos(\phi_T - \phi_0) = \frac{1}{\sqrt{1 + \tan^2(\phi_T - \phi_0)}} = \frac{V_{yz}}{\sqrt{V_{xz}^2 + V_{yz}^2}} \qquad (3)$$

$$a_y = \sin(\phi_T - \phi_0) = \frac{\tan(\phi_T - \phi_0)}{\sqrt{1 + \tan^2(\phi_T - \phi_0)}} = \frac{V_{xz}}{\sqrt{V_{xz}^2 + V_{yz}^2}}$$

and resulting magnetic dipole source strength will be $$M_\rho = M_{x\rho} \cos(\phi_T - \phi_0) + M_{y\rho} \sin(\phi_T - \phi_0) = M. \qquad (4)$$

Mechanical rotation offers alternatives. One alternative is to measure the couplings of TMDs with a LMD. A TMD is in the parallel orientation if its coupling with a LMD is maximal, and other TMDs do not couple with the LMD. Another approach is to rotate the instrument until the coupling of an x-directed transmitter and y-directed receiver is minimal. The magnitude of coupling is used for selection of a TMD pair. The lower of two couplings corresponds to a parallel-directed TMD system and may be used for anisotropy indication.

Figure 4:
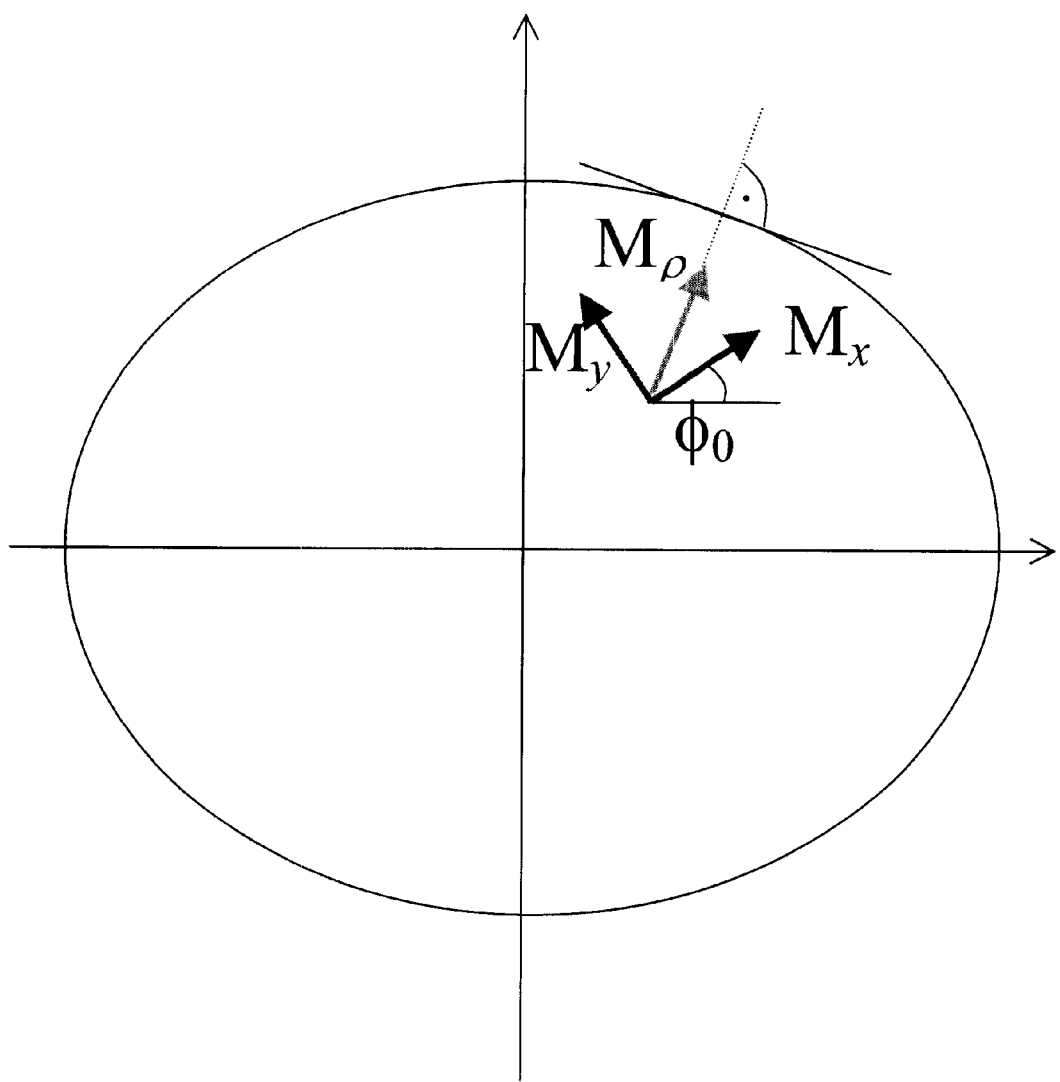
FIG. 4 shows a pictorial looking downhole of two transverse antennas arbitrarily oriented within an elliptical borehole.

FIG. 4 shows two transverse antennas arbitrarily oriented in an elliptical borehole. With an elliptical borehole, the direction of maximal TMD-LMD coupling is approximately perpendicular to the surface of the borehole. Dipoles are rotated until the coupling is maximized, or until the coupling of a TMD transmitter and an orthogonal TMD receiver is minimized. This invention may also be applied when the borehole is perpendicular to strike direction, as it is often the case in wireline logging. In such situations, gravity will decentralize the tool perpendicular to strike. Thus fulfilling the borehole separability condition and allowing for effective use of these techniques. It is noted, however, that these methods may not be as effective at higher angles, arbitrary borehole orientations, or in the vicinity of boundaries.

After focusing and proper rotation of TMDs is performed, the borehole effect is minimized, and resistivity anisotropy parameters of surrounding formations can be determined using conventional inversion techniques known in the art. It will be appreciated that because of the reciprocity theorem, the transmitters and receivers of the disclosed embodiments may be switched without affecting their mutual couplings.

It will be apparent to those skilled in the art that the invention may be implemented by programming one or more suitable general-purpose computers to perform the calculations. The programming may be accomplished through the use of one or more program storage devices readable by the processor and encoding one or more programs of instructions executable by the computer to perform the described operations. The precise forms of the program storage device and of the encoding of instructions are immaterial to the implementation of the disclosed techniques.

Figure 5:
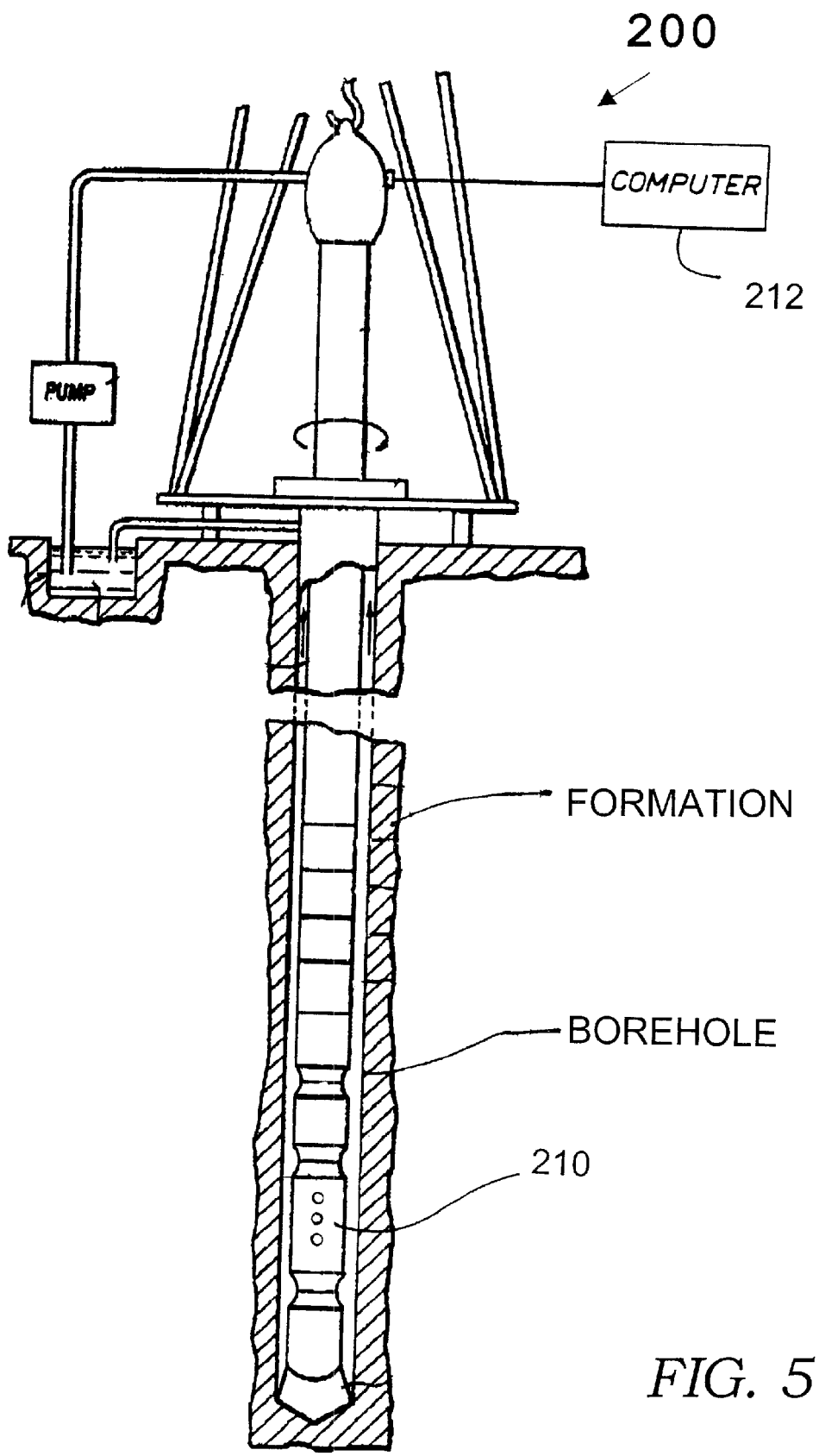
FIG. 5 is a schematic diagram of a logging system in accord with the invention.

The present invention can be implemented in a logging system 200 including a well tool 210 equipped with TMD antennas and an apparatus 212 coupled to the tool 210 as shown in FIG. 5. Certain conventional details are omitted in FIG. 5 for clarity of illustration. The apparatus 212 comprises a computer (such as the general-purpose computer and program storage device described above) coupled to the tool 210. The measured signal data is processed to determine the couplings as known in the art and described herein. From the measured data, the formation resistivity profile can be determined synchronously while logging by using known telemetry techniques or from a recorded-mode after the data is acquired.

Figure 6:
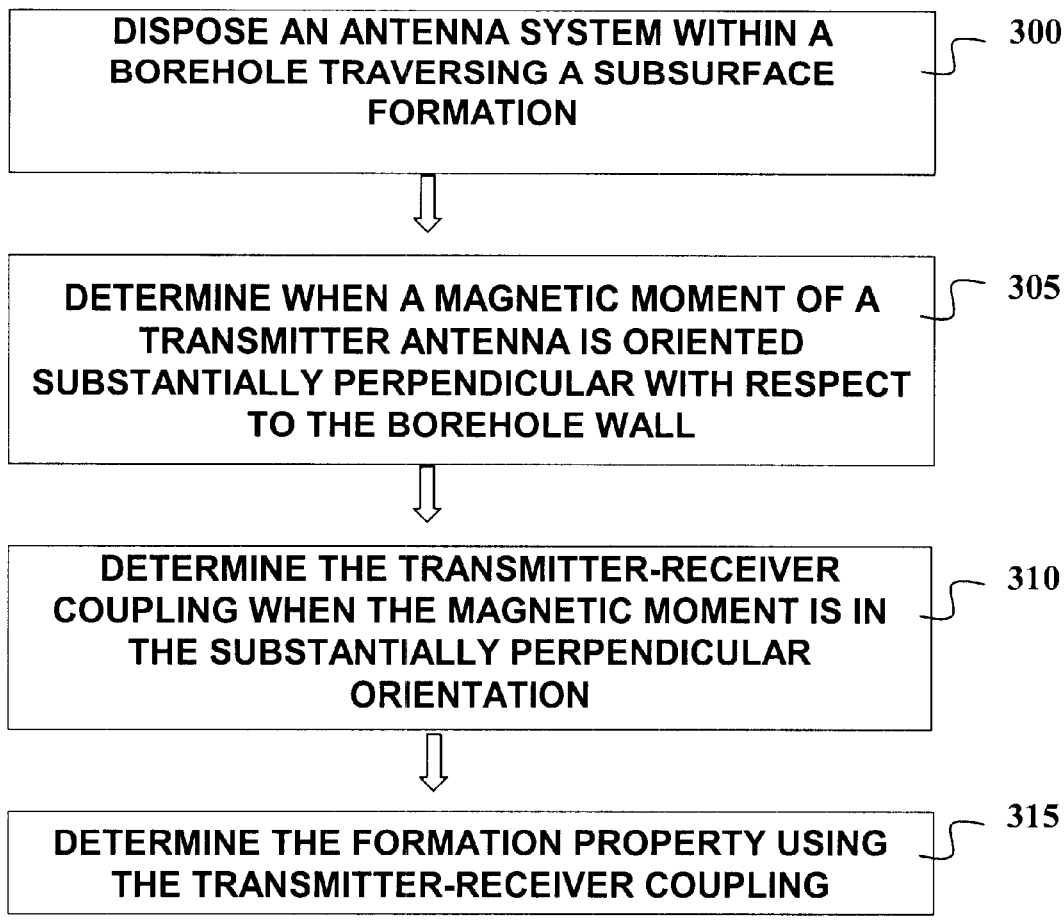
FIG. 6 is a flow chart of a method for determining a formation property using an antenna system in accord with the invention.

FIG. 6 shows a flow chart outlining a process for determining a formation property using an antenna system of the invention. At 300, a TMD antenna system is disposed within a borehole traversing the formation. At 305, it is determined when a magnetic dipole moment of a transmitter of the antenna system is oriented substantially perpendicular with respect to the wall of the borehole using the described techniques. At 310, the coupling between a receiver and the transmitter is determined when the dipole moment is in the orientation substantially perpendicular to the borehole wall. The coupling between the antennas is then used to determine the formation property at 315.

Figure 7:
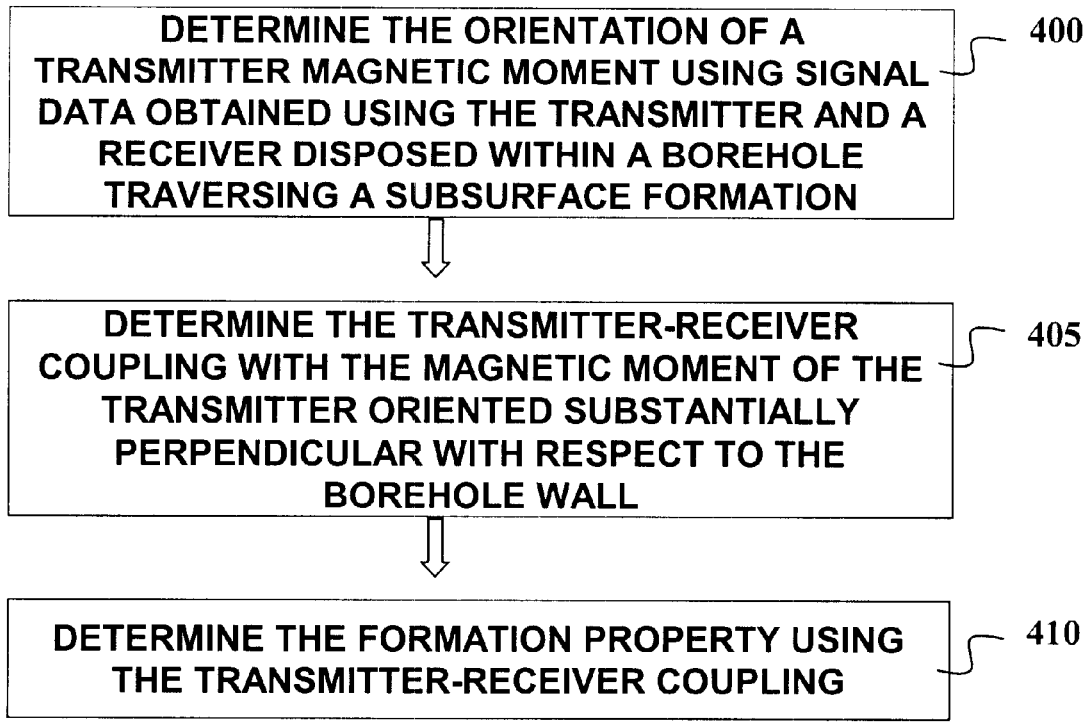
FIG. 7 is another flow chart of another method for determining a formation property in accord with the invention.

FIG. 7 shows another flow chart outlining a process for determining a formation property from signal data obtained using a transmitter and receiver disposed within a borehole traversing the formation in accord with the invention. At 400, the orientation of a magnetic dipole moment of the transmitter is determined using the signal data. At 405, the coupling between the transmitter and the receiver is determined with the dipole moment oriented substantially perpendicular with respect to the borehole wall. The coupling between the antennas is then used to determine the formation property at 410.

It will be understood by those skilled in the art that the invention may be implemented in wireline or while-drilling applications. The invention may also be implemented in a system having a plurality of antennas as known in the art. Such antennas may be placed on the well tool in various sets or configurations and operated at various frequencies to obtain the desired measurements. For example, when used for induction-type measurements, a. system of the invention may include one or more "bucking" antennas (not shown) disposed near a transmitter or receiver. It is well known that signals measured with induction frequencies are affected by direct transmitter-to-receiver coupling. Thus a bucking antenna is typically used to eliminate or reduce these coupling effects. The invention may also be implemented with saddle-coil or flex-circuit antenna configurations (not shown).

While the systems and methods of this invention have been described as specific embodiments, it will be apparent to those skilled in the art that other embodiments of the invention can be readily devised which do not depart from the concept and scope of the invention as disclosed herein. All such similar variations apparent to those skilled in the art are deemed to be within the scope of the invention as defined by the appended claims.

What is claimed is:

1. A method for determining a property of a subsurface formation, with reduced borehole effects, using an antenna system disposed within a borehole traversing said formation, comprising:

a) determining when a magnetic dipole moment of a transmitter antenna of said system is oriented substantially perpendicular with respect to the wall of the borehole;

b) determining the coupling between a receiver antenna of said system having its magnetic dipole moment transverse or tilted with respect to the axis of said borehole and said transmitter antenna when said transmitter dipole moment is in said substantially perpendicular orientation; and c) using the coupling between said antennas to determine the formation property.

2. The method of claim 1, wherein said formation property is resistivity.

3. The method of claim 1, wherein said method is performed during or after the drilling of said borehole.

4. The method of claim 1, wherein step (a) includes directing said dipole moment to said substantially perpendicular orientation.

5. The method or claim 1, wherein step (a) includes determining a maximum coupling between said transmitter antenna and a receiver antenna of said system.

6. The method of claim 1, wherein step (a) includes determining a minimum coupling between said transmitter antenna and a receiver antenna of said system.

7. The method of claim 1, wherein step (a) includes determining the orientation of a magnetic dipole moment of a receiver antenna of said system.

8. The method of claim 1, wherein step (a) includes rotating said transmitter antenna within said borehole.

9. The method of claim 1, wherein step (a) includes rotating a receiver antenna of said system within said borehole.

10. The method of claim 1, wherein said transmitter antenna and/or said receiver antenna comprises a tri-axial set of coils.

11. The method of claim 1, wherein said transmitter antenna and said receiver antenna each comprise a plurality of coils having non-parallel axes.

12. The method of claim 11, wherein step (b) includes determining the coupling between a coil of said transmitter antenna and a coil of said receiver antenna, said coils having the same dipole moment orientations.

13. The method of claim 11, wherein step (a) includes determining the coupling between a coil of a receiver antenna of said system and a coil of said transmitter antenna, said coils having their axes directed substantially perpendicular to the borehole axis.

14. The method of claim 13, wherein the axes of said coils are mutually orthogonal.

15. The method of claim 11, wherein step (a) includes determining the coupling between a coil of a receiver antenna of said system, said coil having its axis directed substantially perpendicular to the borehole axis, and a coil of said transmitter antenna having it axis directed substantially parallel to the borehole axis.

16. The method of claim 11, wherein step (b) includes determining said coupling when at least two coils of said transmitter antenna are simultaneously excited.

17. The method of claim 11, wherein step (a) includes selectively exciting at least two coils of said transmitter antenna and determining the coupling between said transmitter antenna and a receiver antenna of said system.

18. The method of claim 17, wherein said coupling is determined at a coil of said receiver antenna having its axis directed substantially parallel to the axis of said borehole.

19. The method of claim 17, wherein the at least two transmitter coils are excited with alternating currents having different amplitudes.

20. A method for determining a property of a subsurface formation, with reduced borehole effects, from electromagnetic signal data associated with a transmitter antenna and obtained with a receiver antenna disposed within a borehole traversing said formation, comprising:

a) determining the orientation of a magnetic dipole moment of said transmitter antenna using said signal data;

b) determining the coupling, using said signal data, between said transmitter antenna and said receiver antenna having its magnetic dipole moment transverse or tilted with respect to the axis of said borehole with said transmitter dipole moment oriented substantially perpendicular with respect to the wall of the borehole; and c) using the coupling between said antennas to determine the formation property.

21. The method of claim 20, wherein said formation property is resistivity.

22. The method of claim 20, wherein said method is performed during or after the drilling of said borehole.

23. The method of claim 20, wherein said transmitter antenna and said receiver antenna each comprise a plurality of coils having non-parallel axes.

24. The method of claim 23, wherein step (a) includes determining a maximum coupling between a coil of said transmitter antenna and a coil of said receiver antenna.

25. The method of claim 23, wherein step (a) includes determining a minimum coupling between a coil of said transmitter antenna and a coil of said receiver antenna.

26. The method of claim 23, wherein step (a) includes exciting at least two coils of said transmitter antenna with alternating currents having different amplitudes.

27. A well logging system including a well tool adapted for deployment through a borehole traversing an earth formation and an apparatus adapted for coupling to said well tool, the well tool including a transmitter antenna and a receiver antenna disposed thereon, the apparatus comprising:

means for determining when a magnetic dipole moment of said transmitter antenna is oriented substantially perpendicular with respect to the wall of said borehole;

means for determining the coupling between said transmitter antenna and said receiver antenna when said receiver has a mangetic dipole moment transverse or tilted with respect to the axis of said borehole with said transmitter dipole moment in said substantially perpendicular orientation; and means for determining a property of said formation using the determined coupling between said antennas.

28. The system of claim 27, wherein said formation property is resistivity.

29. The system of claim 27, further comprising means for rotating said dipole moment of said transmitter or receiver antenna.

30. The system of claim 27, wherein said transmitter antenna and said receiver antenna each comprise a plurality of coils having non-parallel axes.

31. The system of claim 30, wherein said means for determining when said magnetic moment is in said substantially perpendicular orientation includes means for determining a maximum coupling between a coil of said transmitter antenna and a coil of said receiver antenna.

32. The system of claim 30, wherein said means for determining when said magnetic moment is in said substantially perpendicular orientation includes means for determining a minimum coupling between a coil of said transmitter antenna and a coil of said receiver antenna.

33. The system of claim 30, wherein said means for determining when said magnetic moment is in said substantially perpendicular orientation includes means for determining the coupling between a coil of said receiver antenna having its axis substantially perpendicular to the borehole axis, and a coil of said transmitter antenna having it axis directed substantially parallel to said borehole axis.

34. The system of claim 30, wherein said means for determining when said magnetic moment is in said substantially perpendicular orientation includes means for determining the coupling between a coil of said transmitter antenna and a coil of said receiver antenna, both coils having their axes directed substantially perpendicular to the axis of said borehole.

35. The system of claim 30, wherein said means for determining when said magnetic moment is in said substantially perpendicular orientation includes means for selectively exciting at least two coils of said transmitter antenna.

36. The system of claim 35, wherein said means for determining when said magnetic moment is in said substantially perpendicular orientation includes means for determining the coupling between said excited transmitter coils and a coil of said receiver antenna.

37. The system of claim 35, wherein said at least two coils of said transmitter antenna are excited with alternating currents having different amplitudes.

* * * * *